United States Patent [19]
Royer et al.

[11] Patent Number: 5,944,285
[45] Date of Patent: Aug. 31, 1999

[54] VENT VALVE WITH PRESSURE RELIEF

[75] Inventors: Wilson M. Royer, Renton; Mark J. Gucker, Kirkland, both of Wash.

[73] Assignee: The Boeing Company, Seattle, Wash.

[21] Appl. No.: 08/879,839

[22] Filed: Jun. 19, 1997

[51] Int. Cl.[6] .............................. B64C 1/14; F15B 11/08
[52] U.S. Cl. ......................................... 244/129.4; 91/446
[58] Field of Search .......................... 244/129.5, 129.4, 244/129.1, 78; 91/446, 468

[56] References Cited

U.S. PATENT DOCUMENTS

| | | |
|---|---|---|
| 2,826,215 | 3/1958 | Wolfslau et al. . |
| 4,399,966 | 8/1983 | Crudden et al. ..................... 244/129.4 |
| 4,418,716 | 12/1983 | Starke . |
| 4,584,980 | 4/1986 | Weiger et al. . |
| 4,585,189 | 4/1986 | Buxton ................................. 244/129.4 |
| 4,627,597 | 12/1986 | Brausfeld et al. . |
| 4,697,763 | 10/1987 | Vermilye ............................... 244/129.4 |
| 4,821,774 | 4/1989 | Chorkey . |
| 4,899,785 | 2/1990 | Inokuchi .................................... 91/468 |
| 4,966,196 | 10/1990 | Meyer . |
| 5,172,887 | 12/1992 | Cross et al. . |
| 5,372,338 | 12/1994 | Carlin et al. .......................... 244/129.4 |
| 5,437,216 | 8/1995 | Chapman .................................. 91/446 |

*Primary Examiner*—Charles T. Jordan
*Assistant Examiner*—Theresa M. Wesson
*Attorney, Agent, or Firm*—Christensen O'Connor Johnson & Kindness PLLC

[57] ABSTRACT

A selectively actuatable pressure relief valve (110) includes a housing (112) that defines an annular projection (118), an inlet port (120) in the lower surface (122), and a relief vent (124) in the sidewall. A first plunger (128) and a second plunger (138) are longitudinally disposed within the housing and are actuatable between an open position and closed position. The valve is normally biased in the open position by a pair of springs (136 and 146). The valve may be actuated between the open and closed positions by a solenoid (148) or may be locked into the closed position by the manual override device (154). When the valve is in the closed position, the spring may be overcome by the fluid pressure exceeding a predetermined limit, thereby displacing the valve into the open position and providing high pressure relief.

13 Claims, 3 Drawing Sheets

VENT VALVE WITH PRESSURE RELIEF

FIELD OF THE INVENTION

This invention relates to jet aircraft engines and, more particularly, to pressure relief valves mounted directly on the engine to provide high pressure relief when a ground power bus is energized and very low pressure relief when the ground bus is de-energized.

BACKGROUND OF THE INVENTION

In commercial aircraft having jet engines, it is oftentimes necessary to perform maintenance and repair work on the engine during stopovers along the flight route. Most jet engine cowlings are constructed as two bifurcated half cylinders hingedly attached to the engine or mounting strut so that they can be pivoted upwardly away from the engine core to permit maintenance personnel to access the engine core. Present devices used for opening the cowl halves or "C-ducts," as they are known in the industry, include mechanical screw devices which have poor reliability, hydraulic actuators which are operated either with a separate hand pump, or a powered cowl door opening system such as that disclosed in U.S. Pat. No. 4,399,966.

As is the case with all "dead ended" hydraulic systems in aircraft, including that which is disclosed in U.S. Pat. No. 4,399,966, structural deflections and temperature changes in flight produce significant stress cycling on hydraulic system components. A high pressure relief valve in fluid communication with the hydraulic system will prevent the system from exceeding limit loads because the valve limits the peak pressure. However, variations in the hydraulic fluid pressure below the peak pressure will result in the generation of cyclic loads on the cowl structure, such as actuator fittings, and eventually will cause fatigue failure of that structure.

It is, therefore, an object of the present invention to provide an apparatus that will normally vent the actuator directly to the system return, thereby opening the hydraulic system and defining a very low pressure relief valve.

It is another object of this invention to provide the same relief valve with the capability of being selectively energized, thereby closing the hydraulic system and defining a high pressure relief valve that will provide relief to the system return if a predetermined pressure limit is exceeded.

It is yet another object of the present invention to provide the valve with a manual override such that the valve may be manually or mechanically set into the closed position, and therefore, into the high pressure relief mode.

SUMMARY OF THE INVENTION

In accordance with the foregoing objectives, and in connection with a jet engine having a bifurcated cowl and a hydraulic system to open and close the cowling, a selectively actuatable pressure relief valve in fluid communication with the hydraulic system is provided by the present invention. The valve is actuatable between an open position where fluid is permitted to flow between an inlet and outlet port and a closed position where fluid flow between an inlet and outlet port is blocked or restricted by a high pressure relief valve. The valve includes springs that bias it into the open position.

In a preferred embodiment, the valve may be actuated between the open and closed positions by a solenoid remotely controlled from a location on or near the engine. The solenoid may be powered by a ground-based power source, that when coupled to the valve and energized, the valve is actuated into the closed position and defines a high pressure relief valve. When the ground-based power source is decoupled from the aircraft and the valve is de-energized, the valve is then biased into the open position and defines a low pressure relief valve. The valve also includes a manual or mechanical position selection feature that allows its operation in the event of an electrical power failure.

The present invention reduces problems associated with "dead ended" hydraulic systems causing cyclic loading of system components and, thus, subsequent fatigue failure of the system components and structure. The present invention uses a selectively actuated vent valve that is normally biased in an open position whereby hydraulic fluid is permitted to flow back into the system reservoir, as opposed to the prior art's use of a pressure relief valve that vents the system only if a predetermined pressure limit is exceeded. Thus, the invention eliminates repeated or cyclic loading in a hydraulic system which will eventually cause fatigue failure of various structural and mechanical system components. In addition, the invention's use of an actuating means, such as a solenoid or a device formed from shape memory alloy, allows the operator to selectively actuate the valve of the present invention between the open and closed positions.

The invention's use of a selectively actuated vent valve also reduces the maintenance cost and downtime of an aircraft associated with replacing structure or system components that failed due to the cyclic loading because the valve eliminates the system cyclic loading. Finally, manufacturing costs associated with replacing the valve of the prior art with that of the present invention are minimal because the valve of the present invention does not require any modification of the existing hydraulic system.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
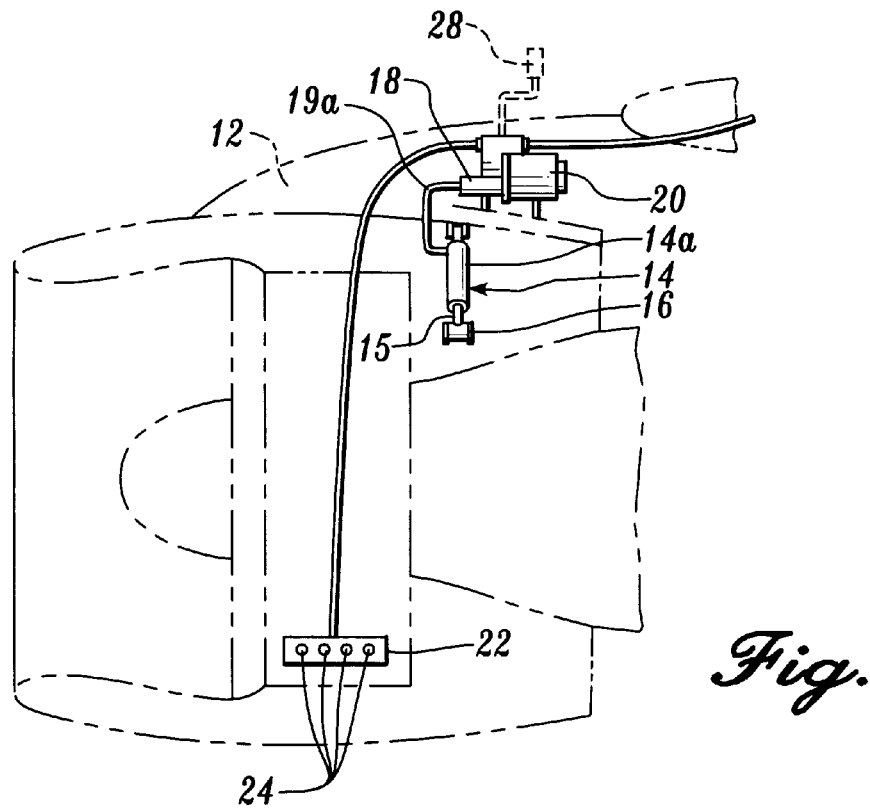
FIG. 1 is a side elevation view with portions removed of a jet aircraft engine having a cowl opening apparatus made in accordance with the principles of the present invention mounted thereon.
Figure 2:
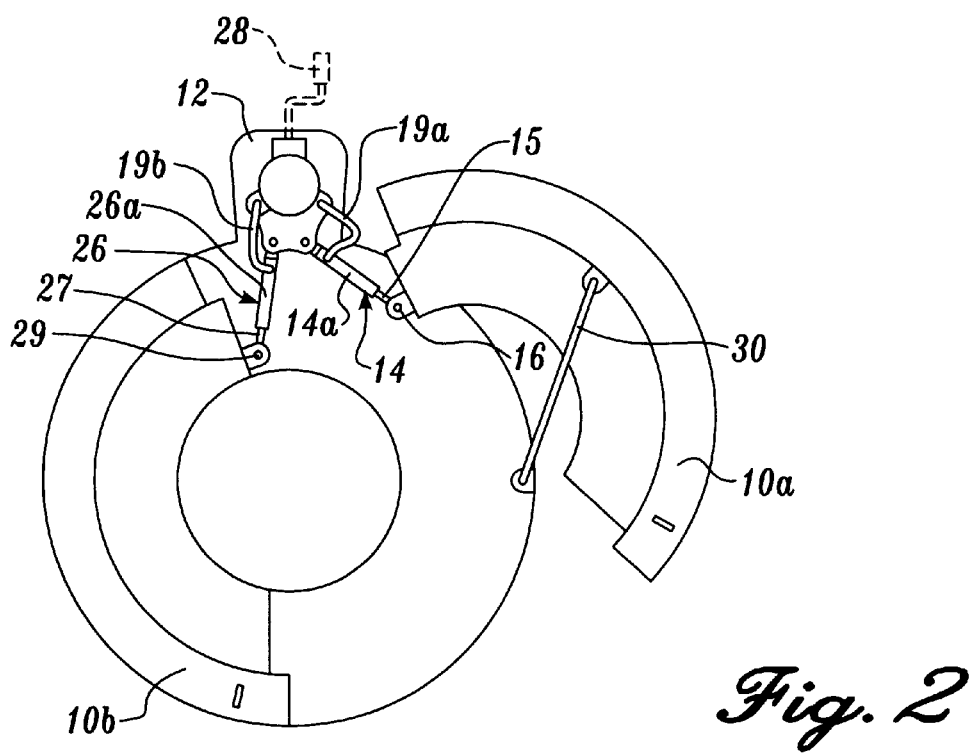
FIG. 2 is a front elevation view of the jet aircraft engine of FIG. 1 with one of the cowl halves in the open position.

Referring now to FIGS. 1 and 2, a conventional turbofan jet engine is shown in general outline. The fan portion of the engine is surrounded by a substantially annular cowl structure which is longitudinally bifurcated along its lowermost portion to form two semicircular cowl sections 10a and 10b. The cowl sections 10a and 10b are hinged to the engine supports adjacent their upper edge so that the cowl sections can be swung away from the engine core to expose the core to maintenance personnel. An apparatus for opening the cowl halves, such as that disclosed in U.S. Pat. No. 4,399,966 to Crudden et al., the disclosure of which is expressly incorporated herein by reference, is mounted on the engine in proximity to the engine mounting strut 12. A hydraulically operated linear actuator 14 is coupled at a first end thereof to an actuator bracket and is kept stationary with respect to the engine mounting strut. The actuator 14 further includes an extensible rod 15 slidably mounted within the cylinder 14a and protruding from a second end of the cylinder. The end of the extensible rod 15 protruding from the cylinder 14a is coupled to a bracket 16 affixed to the cowl section 10a adjacent the upper portion thereof and at a location offset from the hinge line of the cowl section. As hydraulic fluid is supplied into the cylinder 14a through line 19a, the magnitude of extension of extensible rod 15 from the cylinder increases to pivot the cowl section 10a about its hinge line to rotate the cowl section from the engine and expose the engine core. The hydraulic fluid is pumped from a reservoir by hydraulic pump 18, mounted on the engine strut. The hydraulic pump 18 is preferably driven by an electric motor 20. As the hydraulic fluid flows from the reservoir to the actuator, it passes through a series of control valves which are utilized to control the opening and closing of the cowl sections. A control panel 22 mounted in the lower portion of the engine contains switches 24 which control the aforementioned valves, thereby controlling the movement of the cowl sections. A second actuator 26 is provided to open the other cowl portion 10b and is mounted in similar fashion as the first actuator 14. However, the extensible rod 27 of the second actuator is pivotally connected at a first end thereof to a bracket 29 affixed to the cowl section 10b to open and close that cowl section. Hydraulic fluid to operate the second actuator 26 comes from the common reservoir and is pumped by the hydraulic pump 18 through a hydraulic line 19b to the cylinder 26a of the second actuator 26. The operator can select which of the first or second cowl portions 10a or 10b is moved by selective actuation of the switches 24 located on the control panel 22. Preferably, the cowl sections can be opened and closed independently of one another or can be opened and closed simultaneously depending on the switch selection.

In case of failure of the electric motor 20 or lack of a source of electricity to run the electric motor, a manual drive is provided for the hydraulic pump 18 and is actuated through means of the manual crank 28 which will be described in greater detail below.

Although in the preferred embodiment the control valve system for raising and lowering the cowl door is designed to maintain the cowl door in any position desired by means of hydraulic pressure in the valve system, it may be desirable during maintenance on the engine core to provide a rigid hold-open rod 30 which can be inserted between the engine core and the open cowl section as a safety feature to ensure that the cowl door remains in the open position during maintenance work.

Figure 3:
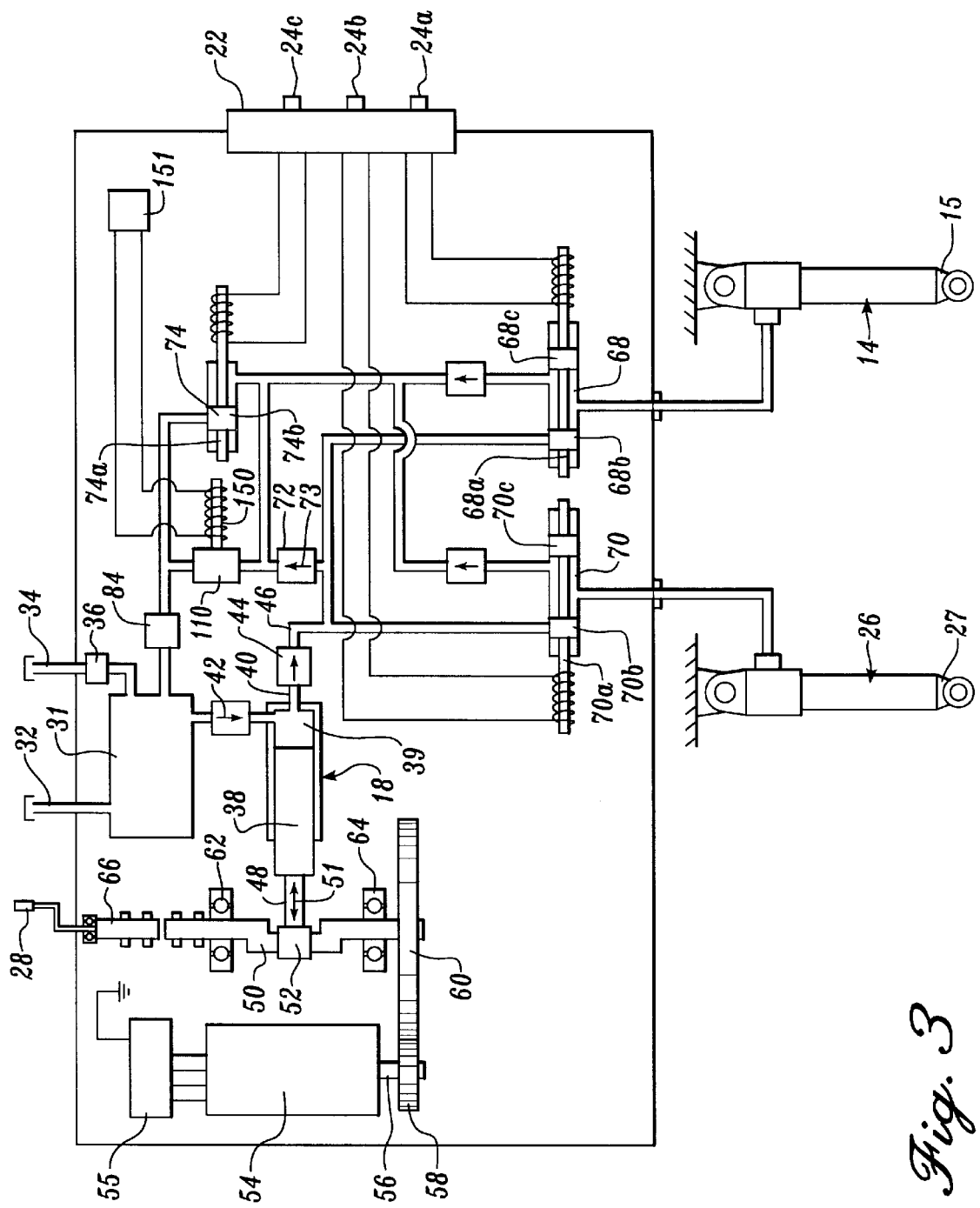
FIG. 3 is a schematic diagram of a hydraulic circuit made in accordance with the principles of the present invention.

Referring now to FIG. 3, the hydraulic control circuit for controlling operation of the first and second actuators 14 and 26 is shown in greater detail. A reservoir 31 contains the hydraulic fluid used in the actuation system. A conventional breather pipe 32 is coupled to the reservoir as well as a fill pipe 34. A filter 36 is installed in the fill line to filter impurities out of the hydraulic fluid during refill of the reservoir. The hydraulic pump 18 preferably comprises a positive displacement, single cylinder/piston assembly. As the piston 38 moves to the left, as viewed in FIG. 3, it draws fluid from the reservoir 31. On the exhaust stroke, i.e., when the piston 38 moves to the right, as viewed in FIG. 3, the fluid, which has been drawn from the reservoir 31, is exhausted through hydraulic line 40 into the remainder of the control circuit. A check valve 42 is inserted in the hydraulic line between the reservoir 31 and the pump cylinder 39 to prevent flow of the fluid back into the reservoir on the exhaust stroke of the pump. The check valve 44, placed in hydraulic line 40, permits flow of hydraulic fluid from the pump cylinder 39 to the hydraulic system but prevents return of fluid to the pump from the hydraulic line 46.

The pump piston 38 is driven through piston rod 48 affixed at a first end thereof to the end of piston 38. The second end of the piston rod 48 is coupled to crankshaft 50 by means of a collar 52. The crankshaft 50 is designed so that upon rotation of the crankshaft the piston rod 48 moves back and forth as shown by the arrow 51, carrying with it the piston 38, thereby producing the suction and exhaust strokes of the piston 38 to draw fluid from the reservoir 31 and force fluid into the hydraulic control circuit.

In its primary mode of operation, the crankshaft 50 is driven by an electric motor 54 coupled to a source of electric power through interconnection box 55. Preferably, the motor is a three-phase AC-type motor capable of operation off of the normal AC current provided by an aircraft source. Preferably, the motor shaft 56 is drivingly coupled to a drive gear 58 which in turn drivingly engages a reduction gear 60, coupled to the crankshaft 50 such that rotation of the motor shaft 56 causes rotation of the drive gear 58 which in turn rotates the reduction gear 60, thereby inducing rotation of the crankshaft 50. In the preferred embodiment the electric motor is a 115 volt AC three-phase 400 Hertz induction motor having a synchronous speed of 8,000 r.p.m. and a full load speed of 7,200/7,400 r.p.m. delivering 0.4 horsepower for a five-minute rating. To provide the required pump speed, the unit employs straight spur reduction gears manufactured of nitrited steel to give good wear characteristics to the gear teeth. Preferably, the drive gear is a twelve-tooth pinion gear which drives a 127-tooth reduction gear 60 to give a reduction ratio of 10.58-to-1, and therefore, a pump speed of 680 r.p.m. at 7,200 r.p.m. motor speed. The crankshaft 50 is mounted in a pair of suitable, conventional bearings 62 and 64 which permit smooth rotation of the crankshaft and inhibit lateral vibration. In the illustrated embodiment, the manual crank 28 is coupled to an auxiliary drive shaft 66 which in turn is coupled to the end of the crankshaft 50 through a slip coupling. In the event of a power failure or failure of the electric motor 54, the slip coupling can be engaged to provide a driving coupling between the drive shaft 66 and the crankshaft 55. The hand crank 28 will then drive the crankshaft 50 and in turn operate the pump 18 to provide hydraulic fluid to the control system to operate the actuators 14 and 26 to open the cowl doors. While a hand crank 28 is illustrated, it is contemplated that the auxiliary drive shaft 66 could also be adapted for connection to a pneumatic or electric drill motor or other power tool and operation of the system could be maintained by use of such a drill motor or power tool, rather than a hand crank.

The flow of hydraulic fluid into and out of the hydraulic actuator 14 is controlled by a valve 68. Likewise, the flow of hydraulic fluid from and to the hydraulic actuator 26 is controlled by a valve 70. The valves 68 and 70 are preferably solenoid-actuated valves and are shown in FIG. 3 in a condition in which the solenoid is de-energized. The valve 68 includes a body having an axial bore formed therein. The valve 68 further includes an inlet port, outlet port, and service port found in the body of the valve and communicating with the bore. A spool 68*a* is slidably mounted within the valve bore. The spool 68*a* has a first land 68*b* and a second land 68*c* formed thereon. In the solenoid de-energized condition, the first land 68*b* blocks the inlet port of the valve 68, preventing fluid from passing to the bore of the valve, thereby preventing fluid from passing the hydraulic actuator 14.

Similarly, the valve 70 includes a body having an axial bore formed therein. The body has an inlet port, an exhaust port and a service port formed therein in fluid communication with said axial bore. A spool 70*a* is slidably mounted within the bore and has a first land 70*b* and a second land 70*c* formed thereon. In the solenoid de-energized position illustrate, the first land 70*b* blocks the inlet port, thereby preventing fluid from passing through the valve to the linear actuator 26.

The fluid, blocked at the inlet ports of the valves 68 and 70, is directed through a check valve 72, as indicated by arrow 73, to the inlet port of a third solenoid valve 74. The third solenoid valve 74 includes a valve body having an axial bore formed therein. The inlet port and an outlet port are formed through the valve body and open to the bore. A valve spool 74*a* slidably mounted within the bore has a land 74*b* formed thereon which blocks the outlet port of the valve in the illustrated solenoid de-energized position thereby preventing passage of the fluid through the third valve. From the check valve 72, fluid is also directed to the vent valve 110 which is selectively operable both as a low pressure and high pressure relief valve.

Figure 4:
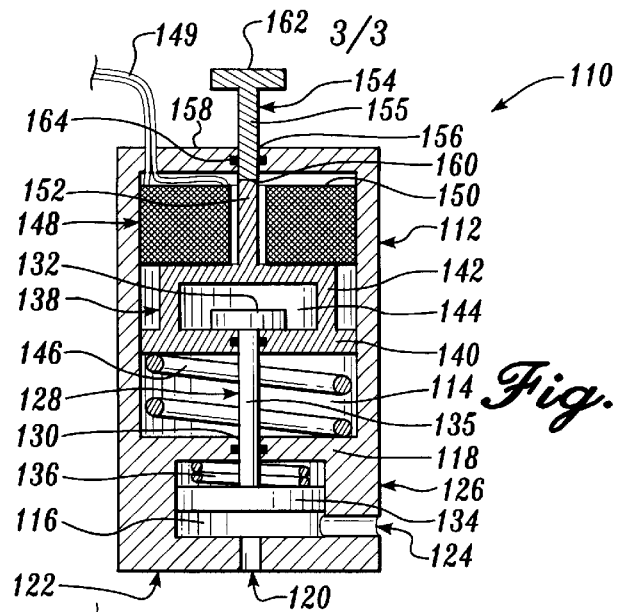
FIG. 4 is a cross-sectional view of a valve made in accordance with the principles of the present invention and is shown in the normally open position.

Referring now to FIG. 4, the vent valve 110 includes a cylindrical housing 112 that defines an internal first and second chamber 114 and 116, longitudinally separated by an annular projection 118 that radially and inwardly protrudes from the interior of the valve housing 112. The vent valve housing 112 also defines an inlet port 120 preferably bored through the lower surface 122 of the housing 112 and into the second chamber 116. A return vent 124 is preferably bored through a sidewall 126 of the housing 112 and into the second chamber 116. Although a single return vent 124 is illustrated in the preferred embodiment, additional return vents are within the scope of the present invention. Furthermore, although the preferred embodiment of the vent valve 110 locates the inlet port 120 in the lower surface 122 of the housing 112 and the return port 124 is located in a sidewall 126, additional locations of the ports 120 and 124, such as both ports located in the sidewall 126 or the lower surface 122, are also within the scope of the present invention.

A plunger 128 is longitudinally disposed within the valve housing 112 and is slidably inserted within the aperture 130 defined by the annular projection 118. The plunger 128 defines a flange 132 and a piston 134 that are connected and longitudinally spaced by a shaft 135. The piston 134 has a diameter that is slightly smaller than the diameter of the second chamber 116 such that the plunger 128 is able to reciprocate therein but sealingly engage the walls of chamber 116. A first spring 136 is disposed in compression between the lower surface of the annular projection 118 and the upper surface of the piston 134.

Still referring to FIG. 4, a second plunger 138 is longitudinally disposed within the valve housing 112. The second plunger 138 has an annular base 140 and a body 142. The annular base 140 has a diameter that is slightly smaller than the diameter defined by the first chamber 114 such that the plunger 138 is able to reciprocate therein but sealingly engage the walls of chamber 114. A second spring 146 is disposed in compression between the upper surface of the annular projection 118 and the lower surface of the base 140.

The interior of the body 142 is hollow such that a cavity 144 is defined within the plunger 138. The shaft 135 extends upwardly through a central opening in projection 118 and through a similar opening in the annular base 140 of the second plunger 138. Suitable seals, such as O-rings, are provided to provide a fluid seal between the shaft and the openings. The flange 132 of first plunger 128 is positioned within cavity 144 and longitudinally engages the upper surface of the base 140 within the body 142 such that the two plungers 128 and 138 are capable of reciprocating in the longitudinal direction relative to and independent of each other. The upper surface of the base 140 engages the lower surface of the first flange 132 such that an upward displacement of the second plunger 138 may displace the first plunger 128 in the same direction. Likewise, a downward displacement of the first plunger 128 may displace the second plunger 138 in the downward direction.

As thusly configured, the first and second plungers are actuatable between an open position, where fluid enters through the inlet port 120 into the second chamber 116 and out the return vent 124, and a closed position where the inlet port 120 and vent 124 are blocked by the second flange 134. Additional methods of blocking flow between the inlet port 120 and the return vent 124, such as a poppet valve, are within the scope of the present invention. The spring rate of the second spring 146 is greater than that of the first spring 136 such that the valve 110 is biased upwardly into the open position, as shown in FIG. 4.

The valve 110 may be actuated between the open and closed positions by a solenoid 148. The solenoid includes solenoid coils 150 disposed within the upper section of the valve housing 112. An armature 152 is longitudinally disposed within the coils 150 and is attached to the upper surface of body section 142 of the second plunger 138. External power is provided to the solenoid 148 by the power cables 149 that extend through the upper surface 158 of the valve housing 112.

Figure 5:
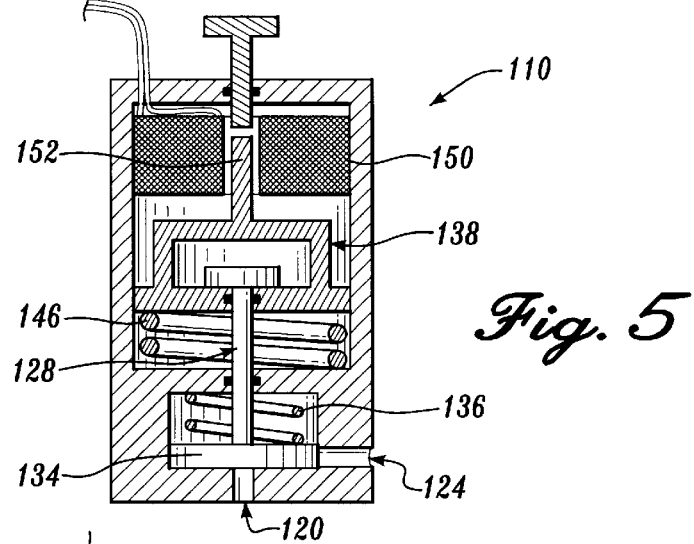
FIG. 5 is a cross-sectional view of a valve of the present invention shown in the closed position hereby defining a high pressure relief valve.

Operationally, when the solenoid 148 is de-energized, the valve 110 is in its normally opened position, as seen in FIG. 4. Referring now to FIG. 5, when the solenoid is energized, the armature 152 is downwardly displaced by the magnetic field created by the solenoid coils 150. As the armature 152 is thusly displaced, it downwardly displaces the second plunger 138 such that the second spring 146 is compressed, thereby disengaging the first plunger 128. The first spring 136, however, downwardly displaces the first plunger 128 such that the second flange 134 blocks fluid flow between the inlet port 120 and the return vent 124 by sealing the inlet port 120. As thusly described, the valve 110 is configured as a high pressure vent valve.

Figure 6:
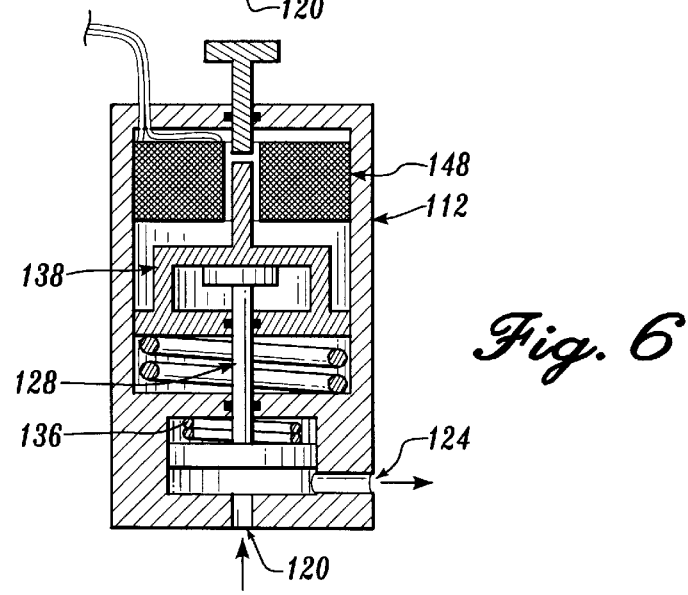
FIG. 6 is a cross-sectional view of a valve of the present invention shown as a functioning high pressure relief valve.

When the valve 110 is in the closed position, as seen in FIG. 5, the second spring 136 may be overcome by a predetermined fluid pressure at the inlet port 120, thereby providing high pressure relief and venting the hydraulic system through the return vent 124. Referring to FIG. 6, when the solenoid 148 is energized, the first and second plungers 128 are normally downwardly displaced into the closed position as described above. However, whenever fluid pressure at the inlet port 120 exceeds a predetermined limit, the downward force of the second spring 136 is overcome and the first plunger 128 slides longitudinally upward, thereby allowing fluid to flow from the inlet port 120 to the relief vent 124, thus relieving the fluid pressure within the hydraulic circuit. From the valve 110, as seen in FIG. 3, the fluid flows back to the reservoir 31, first passing through a filter 84 to remove any impurities that may have been imparted to the fluid.

Although a solenoid is the preferred method of actuating the valve 110, other well known methods in the art, such as a device formed from shape memory alloy, are also within the scope of the present invention. A shape memory alloy is one which, when deformed, will return to its original predetermined shape when the temperature is raised by passing an electrical current through it. Thus, a shape memory alloy may be used to actuate the valve 110 between the open and closed positions in the same manner as the armature 152 actuates the valve 110 as described above.

The present invention also includes a manual override device to selectively actuate the valve 110. Various methods of manually actuating valves, such as valve 110, between open and closed positions are readily known and used by those of ordinary skill in the art. One such method is a manual override device 154, as seen in FIG. 4, that includes a rod 155 that longitudinally extends through an aperture 156 in the upper surface 158 of the valve housing 112. The manual override device 154 defines a first end 160 that is coupled to the armature 152 such that the valve 110 may be manually actuated between the open and closed positions. The manual override device 154 includes a flat surface handle 162 and a conventional O-ring 164 is used to seal the override device 154 as it extends through the aperture 156. The method of manually actuating valves, such as valve 110, between open and closed positions changes depending upon the application and does not influence the general operation of the present invention.

Referring back to FIG. 3, the coils 150 of the valve 110 are connected to a conventional ground power handling bus connector 151 that is capable of receiving electrical power from a ground power bus (not shown). Whenever the ground power bus is received by the connector 151 and energized, thereby energizing the solenoid, current is provided to the coils 150 to downwardly displace the first and second plungers 128 and 138 into the closed position as previously described.

The previously described versions of the present invention has the significant advantage of lowering maintenance costs of aircraft. The valve 110 provides an apparatus that vents an otherwise "dead end" hydraulic system, thereby eliminating fatigue failures due to cyclic loading associated with such closed systems. Additionally, because the valve 110 can directly replace the existing relief valve without modification, it is both a cost and time effective solution to a fatigue load problem that has been plaguing airlines and airplane manufacturers for an extended period.

While a preferred embodiment of the invention has been described and illustrated herein, it will be apparent to those of ordinary skill in the art and others that several modifications can be made to the vent valve without affecting either the spirit or scope of the present invention. The illustrated and described embodiment is to be considered as exemplary only and the invention itself should be evaluated only as defined in the claims which follow.

The embodiments of the invention in which an exclusive property or privilege is claimed are defined as follows:

1. In an aircraft having a jet engine and a cowl for covering said jet engine, hinge means for swingably affixing said cowl to said engine for movement between a first closed position and a second open position wherein said cowl is spaced from said engine to allow access thereto, hydraulic actuator means for moving said cowl between said open and closed position, including a hydraulic actuator, pump means for supplying pressurized hydraulic fluid, first conduit means for placing said pump means in fluid communication with said hydraulic actuator, a reservoir for holding hydraulic fluid, and a second conduit means coupled to said reservoir for returning hydraulic fluid thereto, the improvement comprising:

a selectively actuatable pressure relief valve operatively coupled between said first conduit means and said second conduit means, said pressure relief valve being actuatable between
(a) a first position wherein said first conduit means is placed in fluid communication with said second conduit means; and
(b) a second position wherein fluid flow from said first conduit means to said second conduit means is blocked;

means for biasing said pressure relief valve toward said first position; and actuating means for selectively moving said pressure relief valve from said first position to said second position.

2. The improvement of claim 1 further comprising:

manual override means for manually moving said pressure relief valve from said first position to said second position.

3. The improvement of claim 1, wherein said aircraft includes a means for receiving electrical power from a ground based source that is selectively couplable to said aircraft, said actuating means being energized in response to said aircraft being coupled to said ground based source of electrical energy.

4. The improvement of claim 1, wherein said biasing means being disposed within said valve such that pressure relief is provided when said valve is in said second position and fluid pressure within said first conduit means exceeds a predetermined limit.

5. The improvement of claim 1, wherein said biasing means is a spring.

6. The improvement of claim 1, wherein said actuating means is a solenoid.

7. In an aircraft having a jet engine, said engine having an annular cowl covering at least a portion of said engine, said cowl being longitudinally bifurcated to form first and second cowl portions, each of said cowl portions being hingedly attached to said engine for swinging movement of each of said cowl portions between a first position in which said cowl portions are joined together and a second position in which said cowl portions are spaced from said engine to expose said portion of said engine, an apparatus for moving said cowl portions between their respective first and second positions, a first linear hydraulic actuator associated with said engine and said first cowl portion and operable to move said first cowl portion from its first position to its second position, a second linear hydraulic actuator associated with said engine and said second cowl portion and operable to move said second cowl portion from its first position to its second position., hydraulic fluid reservoir means mounted on said engine for supplying hydraulic fluid to said actuators, and a hydraulic control means associated with said reservoir means and said actuators and selectively operable to direct fluid from said reservoir means to said actuators to operate said actuators, wherein the improvement comprises:

a selectively actuatable pressure relief valve mounted on said engine having first and second ends spaced by a sidewall defining a valve housing, said first end defining an inlet port in fluid communication with said first and second hydraulic actuators, and said sidewall defining an outlet port;

actuating means mounted within said valve housing having a plunger capable of moving between an open position where fluid may flow between said inlet port and outlet port and a closed position in which fluid flow between said inlet port and outlet port is blocked;

biasing means located in said valve housing between said plunger and said housing to bias said valve into the open position, said biasing means being disposed on said plunger such that pressure relief is provided when said valve is in said closed position and said fluid pressure exceeds a predetermined limit;

manual override means for manually moving said pressure relief valve from said open position to said closed position; and means for receiving electrical power from a ground based source that is selectively couplable to said aircraft, said actuating means being energized in response to said aircraft being coupled to said ground based source of electrical energy.

8. The improvement of claim 7, wherein said actuating means is a solenoid.

9. The improvement of claim 7, wherein said biasing means is a spring.

10. In an aircraft having a hydraulic circuit, a fluid control valve integral to said circuit comprising:

an elongate valve housing defining an internal cavity and first and second ends longitudinally spaced by a cylindrical sidewall, said first end defining an inlet port in fluid communication with first and second hydraulic actuators, said sidewall defining an outlet port;

a first plunger longitudinally disposed within said valve housing and slidable therein, said plunger having a first end and a second end longitudinally spaced therefrom, said first plunger being movable between an open position where fluid may flow between said inlet port and said outlet port and a closed position in which fluid flowing between said inlet port and said outlet port is blocked;

actuating means located within said valve housing for moving said first plunger between said open and closed positions upon being energized;

biasing means disposed within said valve housing and extending therefrom to said first plunger to bias said plunger into said open position, said biasing means being disposed within said valve housing such that pressure relief is provided when said plunger is in said closed position and circuit fluid pressure exceeds a predetermined limit;

manual override means for manually moving said valve from said open position to said closed position; and means for receiving electrical power from a ground based source that is selectively couplable to said aircraft, said actuating means being energized in response to said aircraft being coupled to said ground based source of electrical energy.

11. The fluid control valve of claim 10 further comprising a second plunger longitudinally disposed within said valve housing and slidable therein, said second plunger having a first end coaxially engaged by said second end of said first plunger and movable between said open and closed positions, said second plunger having a second end defining a sealing means longitudinally spaced from said first plunger.

12. The fluid control valve of claim 10, wherein said actuating means is a solenoid.

13. The fluid control valve of claim 10, wherein said biasing means is a spring.

* * * * *